July 5, 1927.
A. H. WADELL
1,634,389
MACHINE FOR BORING THE BEARINGS OF CONNECTING RODS
Filed Dec. 15 1925   2 Sheets-Sheet 1
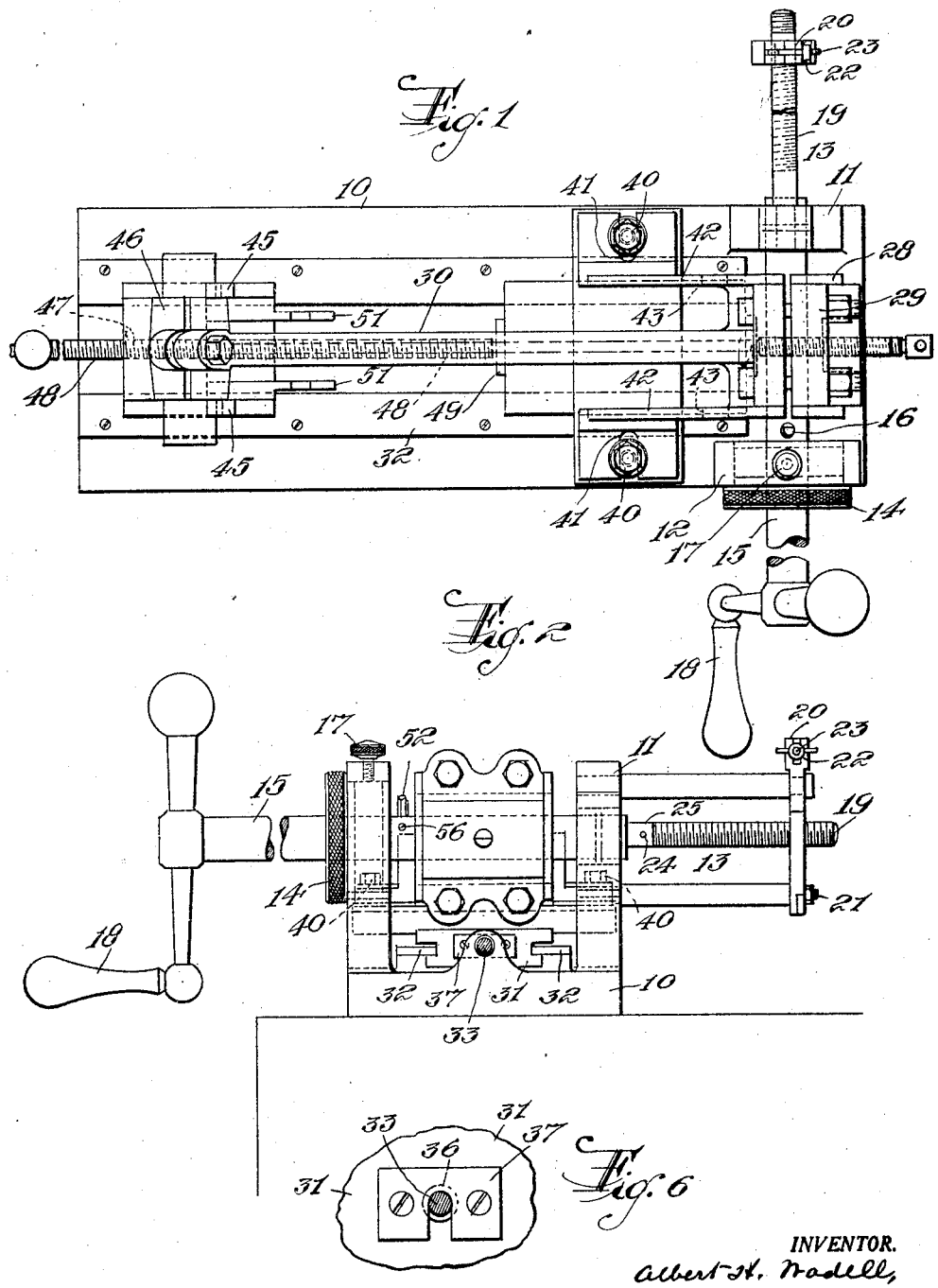

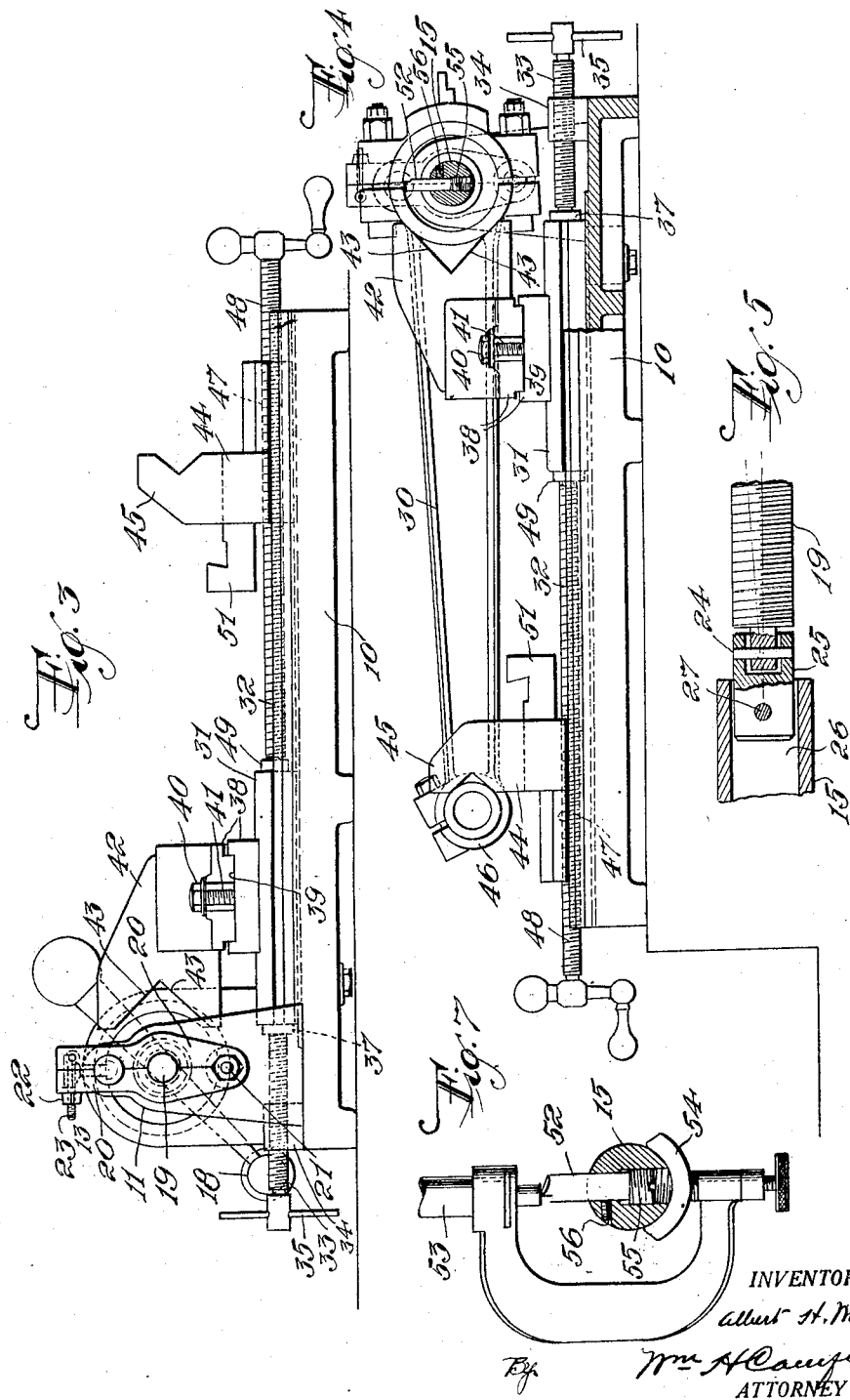

Patented July 5, 1927.

1,634,389

UNITED STATES PATENT OFFICE.

ALBERT H. WADELL, OF NEWARK, NEW JERSEY.

MACHINE FOR BORING THE BEARINGS OF CONNECTING RODS.

Application filed December 15, 1925. Serial No. 75,506.

This invention relates to an improved machine for boring the bearings of connecting rods and like mechanical elements and is adapted for use on any of the usual styles and sizes of connecting rods being particularly constructed for boring the rods used in automobile motors.

The device is adapted for quick insertion, boring and removal of connecting rods and with this rapid working of the machine economy of operation and assured accuracy of the work are also possible.

The invention is an improvement developed during the operation of machines constructed according to my previous Patent No. 1,494,969, issued May 20, 1924.

The invention is illustrated in the accompanying drawings in which Figure 1 is a plan view of a machine made according to my invention and Figure 2 is an end view thereof. Figure 3 is a side view of the machine and Figure 4 is a view of the other side with a part thereof shown in section, this view illustrating a connecting rod in place. Figure 5 is a detail sectional view of the connection between the boring shaft and the screw thereof. Figure 6 is a detail section of the connection between one of the actuating screws and one of the sliding supports and Figure 7 is a view showing how in a micrometer of special make it is used to set the boring tool.

The invention is designed for an accurate and quick boring of the bearing of a connecting rod and consists of the base 10 which is provided with two standards 11 and 12 receiving the respective bearings 13 and 14, the bearing 14 being of large diameter so that the shaft 15 can be withdrawn with its boring tool or cutter 16 without disturbing the cutter. The screw 17 holds the bearing 14 normally in position.

The shaft 15 is operated by a suitable handle 18 and when it is rotated it is progressed by a screw 19 which is in screw-threaded engagement with a nut formed of half sections 20 which are pivoted to the post 21 and can be swung together to embrace the screw and are held in this close engagement by a nut 22 on the screw 23.

In the event that undue strain or slight bending of the screw takes place I fasten the screw by a pin 24 to the knuckle 25 which fits into a recess 26 on the end of the shaft 15 and has a slight motion being slightly smaller than the recess so that it can swing to a limited extent on the pin 27 which is at right angles to the pin 24.

It will thus be evident that when the handle 18 is rotated the end of the tool 16 pursues a helical path and finishes the inside of the bearing 28 of the end 29 of the connecting rod 30.

The invention resides particularly in the ready and easily operated mechanism for seating the connection rod in position to be bored and the mechanism is constructed to provide an adjustment or stop for the device so that one end of the rod is seated promptly in position and a continued operation of the seating means causes a tight engagement with the other end of the connecting rod so that the single means acts to seat and then fasten both ends of the rod. A reversed operation of the single means releases the connecting rod.

The mechanism for holding the rod comprises a slide 31 which can slide on suitable guides, as 32, on the base 10. The adjustable stop is shown as a screw 33 which is in screw-threaded engagement with a boss 34 on the base and has a handle 35 for operating it. The screw has a head 36 which is seated under a plate 37 on the slide so that the slide can be either pushed or pulled along the base and this adjustment is permanent so far as a group of certain sized rods is concerned, as it is only operated to adjust the holding means when a size different from the one previously bored is inserted.

On the slide 31 are the blocks 38, one on each side and adjustable in the groove 39 to receive the various widths of connecting rods and are held in adjusted positions by the bolts 40 passing through slots 41 into the slide 31. On each block 38 is a plate 42 with a bifurcated end forming jaws 43 which are relatively thin so they can receive the outer edges of the bearings 28 of the connecting rod. This support after adjustment remains in place for the reception of a connecting rod and a second support is then caused to engage the other end of the connecting rod.

This second support is illustrated as a slide 44 slidable on the guides 32 of the base 10 and having a pair of jaws 45 to receive the ends of the small bearing 46. The support has a screw-threaded bore 47 through which passes the screw 48. The screw is rotatably secured to the first support 31 by a head under a plate 49 in a manner similar to that shown at 37. A handle 50 on the end of the longitudinal screw 48 is a means for its easy and convenient manipulation. In case of a small size connecting rod and to avoid the necessity of excessive turning of the screw, I install supplemental jaws 51 on the inner side of the slide 44.

When the bearing of a connecting rod is to be bored the nut 20 is released and the shaft 15 is withdrawn. The boring tool 52 is then set by means of a micrometer 53 which is provided with a shoe 54 which fits under the shaft 15 and the boring tool 52 is thus accurately set as to its projection, the size of the boring thus determined. The supporting screw 55 and a lock screw 56 are usually employed to hold the tool 52 in position.

The connecting rod is then placed with its bearing 28 in the sets of jaws 43. The machine is constructed with the centre of these jaws opposite the center of the bearings 11 and 12 so that no vertical adjustment is necessary.

The longitudinal adjustment, that is, the primary adjustment or stop of the slide 31 is regulated by the screw 33. This adjustment by the screw 33 is only necessary when the connecting rod to be bored is of a different size than the one previously acted on or when a group of the same size is to be bored only the first one need be set so far as the support or slide 31 is concerned. A rotation of the screw 48 then moves the support 44 to the rear because the support 31 is held against movement and a quick clamping or pressing by the jaws 45 against the bearing 46 holds the connecting rod securely in position to be bored.

I claim:

1. A boring machine comprising a base, a boring device in the base, a stop in the base, a support slidable on the base and limited in one direction by engagement with the stop, a second support, means abutting on the first support and for moving the second support, the supports being adapted to engage the bearings on the ends of a connecting rod and thus support the connecting rod in place for boring, the connecting rod thus limiting the outward movement of the second support.

2. A boring machine comprising a base with a pair of supports slidable on the base, the supports having outwardly extending jaws for engaging the bearings at the ends of a connecting rod, a stop for limiting the outward sliding movement of one support, and a screw in screw-threaded engagement with the second support and bearing on the first support.

3. A boring machine comprising a base, a boring device, a support slidable on the base toward and from the boring device, a stop for limiting its sliding toward said device, a second support, a screw extending through and in threaded engagement with the second support, said screw having one end disposed so as to abut on the first support, and means on the supports for engaging the bearings of a connecting rod.

4. A boring machine comprising a base, a boring device, a support slidable on the base toward and from the boring device, a stop for limiting its sliding toward said device, a second support, a screw extending through and in threaded engagement with the second support, said screw having one end disposed so as to abut on the first support, and plates having divergent faces, said plates being disposed on the supports so that said faces will engage the exterior flanges of the bearings at the ends of a connecting rod.

5. A boring machine comprising a boring device, a base having said boring device at one end and having a slideway arranged longitudinally thereon, a support in the slideway and having V-shaped jaws thereon, a second support in the slideway and having V-shaped jaws directed in the opposite direction to the first mentioned jaws, a screw in the base acting as a stop for the first support, and a screw in screw-threaded engagement with and extending through the second support, said screw having one end adapted to abut in the first support and having the other end extended for manual operation.

In testimony whereof I affix my signature.

ALBERT H. WADELL.